United States Patent [19]

Urakami

[11] Patent Number: 4,997,052

[45] Date of Patent: Mar. 5, 1991

[54] DEVICE FOR MOVING ALONG A WALL SURFACE WHILE SUCTION-ADHERING THERETO

[76] Inventor: Fukashi Urakami, Maruyoshi Bldg. 608, 17-24 Konandai 4-chome, Konan-ku, Yokohama, Japan

[21] Appl. No.: 496,647

[22] Filed: Mar. 21, 1990

[30] Foreign Application Priority Data

Mar. 23, 1989 [JP] Japan ................................. 1-71578

[51] Int. Cl.$^5$ ............................................. B63B 9/00
[52] U.S. Cl. .................................. 180/164; 180/901; 51/180; 51/429; 51/273; 114/222; 15/98
[58] Field of Search ................. 51/180, 174, 175, 410, 51/170 TL, 429, 273; 180/164, 901; 114/222; 15/52, 98, 49 C

[56] References Cited

U.S. PATENT DOCUMENTS

| 3,495,358 | 2/1970 | Riedi | 51/273 |
| 4,095,378 | 6/1978 | Urakami | 51/425 |
| 4,860,400 | 8/1989 | Urakami | 51/273 |

Primary Examiner—Robert A. Rose

Attorney, Agent, or Firm—Beveridge, DeGrandi & Weilacher

[57] ABSTRACT

A wall surface suction-adhering and moving device including a supporting frame and at least one suction-adhering and moving unit. The device moves along the wall surface while suction-adhering thereto. The suction-adhering and moving unit includes a rotating member rotatably mounted on the supporting frame, and a sealing member for forming a pressure-reduction space in cooperation with the wall surface and the rotating member. The sealing member has an annular base portion fixed to the rotating member, a cylindrical main portion extending from the base portion in a direction away from the rotating member, and an annular contacting portion to be kept in contact with the wall surface. The suction-adhering and moving unit further includes a roller means rotatably supported on the supporting frame with its outer circumferential surface adapted to be pushed against the wall surface via the contacting surface of the sealing member, and a rotating driving source connected to either the rotating member and the roller means.

3 Claims, 2 Drawing Sheets

DEVICE FOR MOVING ALONG A WALL SURFACE WHILE SUCTION-ADHERING THERETO

FIELD OF THE INVENTION

This invention relates to a device for moving along a wall surface, such as the outer wall surface, ceiling surface or floor wall surface of a building, the inside and outside wall surfaces of a storage tank or the outer wall surface of a ship while suction-adhering to it by the pressure of an ambient fluid such as air or water. A working means such as a cleaning means is provided in this type of moving device to perform the required work on the wall surface.

DESCRIPTION OF THE PRIOR ART

A typical type of the above suction-adhering moving device is disclosed in U.S. Pat. No. 4,095,378 (corresponding to Japanese Patent Publication No. 26752/1985). It comprises a supporting frame, a pressure receiving disc mounted on the supporting frame, a cylindrical seal member extending from the pressure-receiving disc toward a wall surface, a plurality of wheels mounted rotatably on the supporting frame, and a rotating driving source which may be an electric motor for driving these wheels. This seal member is formed of a flexible material such as synthetic rubber, and forms a pressure-reduction space in cooperation with the wall surface and the pressure-receiving disc. This pressure-reduction space is reduced in pressure by a suitable pressure-reducing means such as a vacuum pump. The pressure of the ambient fluid acting on the pressure-receiving disc owing to the difference in pressure between the inside and the outside of the pressure-reduction space is transmitted to the wall surface mainly via the plurality of wheels, and thereby, the device is suction-adhered to the wall surface. When the plurality of wheels are driven by the rotating driving source, the device moves along the wall surface. The device includes a working means such as a cleaning means for injecting sweeping particles against the wall surface in the pressure-reduction space, and by this working means, a work such as cleaning is performed on the wall surface.

However, the conventional device for moving along a wall surface while suction-adhering thereto necessarily requires a considerably high cost of production because the device has a plurality of wheels and a driving source for driving them separately from the seal member for forming the pressure-reduction space, and a working means for performing a required work on the wall surface, and therefore becomes large sized and is heavy in weight.

SUMMARY OF THE INVENTION

It is a primary object of this invention to provide a novel and improved device for moving along a wall surface while suction-adhering thereto which can be built in a much smaller size and lighter weight at a much lower cost of production than the aforesaid conventional device. The gist of achieving the above object consists in dexterously utilizing the seal means for forming a pressure-reduction space also for moving the device along the wall surface. For this purpose, the moving device of this invention employs the following novel features.

(a) A seal member is fixed to a rotating member mounted rotatably on a frame.

(b) A roller means which is drawn towards the wall surface a contacting portion of the seal member positioned between the wall surface and the roller means such that the roller means and contacting portion are in frictional contact when the device is in operation which makes contact with the wall surface is also rotatably mounted on the frame member.

(c) Either the rotating member or the roller means is connected to the rotating driving source.

Thus, according to this invention, there is provided a device for moving along a wall surface while suction-adhering thereto, comprising a supporting frame and at least one suction-adhering and moving unit mounted on the supporting frame, said suction-adhering and moving unit having a rotating member mounted rotatably on the supporting frame, a seal member for forming a pressure-reduction space in cooperation with a wall surface and the rotating member, said sealing member having an annular base portion fixed to the rotating member, a cylindrical main portion extending from the base portion in a direction away from the rotating member and an annular contacting portion to be kept into contact with the wall surface, a roller means rotatably supported on the supporting frame with the outer peripheral surface of the roller means adapted to be pushed against the wall surface via the contacting portion of the sealing member, and a rotating driving source connected to either one of the rotating member and the roller means; wherein said device is suction-adhered to the wall surface as a result of reducing the pressure of the pressure-reduction space, and by energizing the rotating driving source, the rotating member and the roller means are both rotated to thereby, move said device along the wall unit.

By the wall surface suction-adhering device of this invention, the pressure of an ambient fluid acting on the rotating member or frame member owing to the difference in pressure between the inside and outside of the pressure-reduction space is transmitted to the wall surface mainly through the roller means. Accordingly, the contacting of the sealing member is strongly pressed against the wall surface at that site where the roller means exists, and when the seal member is rotated in a specific direction by this local increase in pressing force, a driving force is created by which the device is moved in a specific direction. Thus, only the provision of this roller means which is pressed against the wall surface via the contacting portion of the seal member contributes effectively to the moving of the device. Furthermore, because the seal member is rotated, the seal member itself exerts a cleaning action on the wall surface by friction and sliding. If desired, to aid in the cleaning action, a suitable cleaning means such as a brushing means may be provided in the seal member. Accordingly, as compared with the conventional wall surface suction-adhering and moving device which requires the separate provision of a plurality of driving means such as wheels for moving the device, the wall surface suction-adhering and moving device of this invention can be built in a much smaller size and a much lighter weight at a much lower cost.

DETAILED DESCRIPTION OF PREFERRED EMBODIMENTS

The present invention will be described below in detail with reference to the drawings showing its preferred embodiments.

Figure 1:
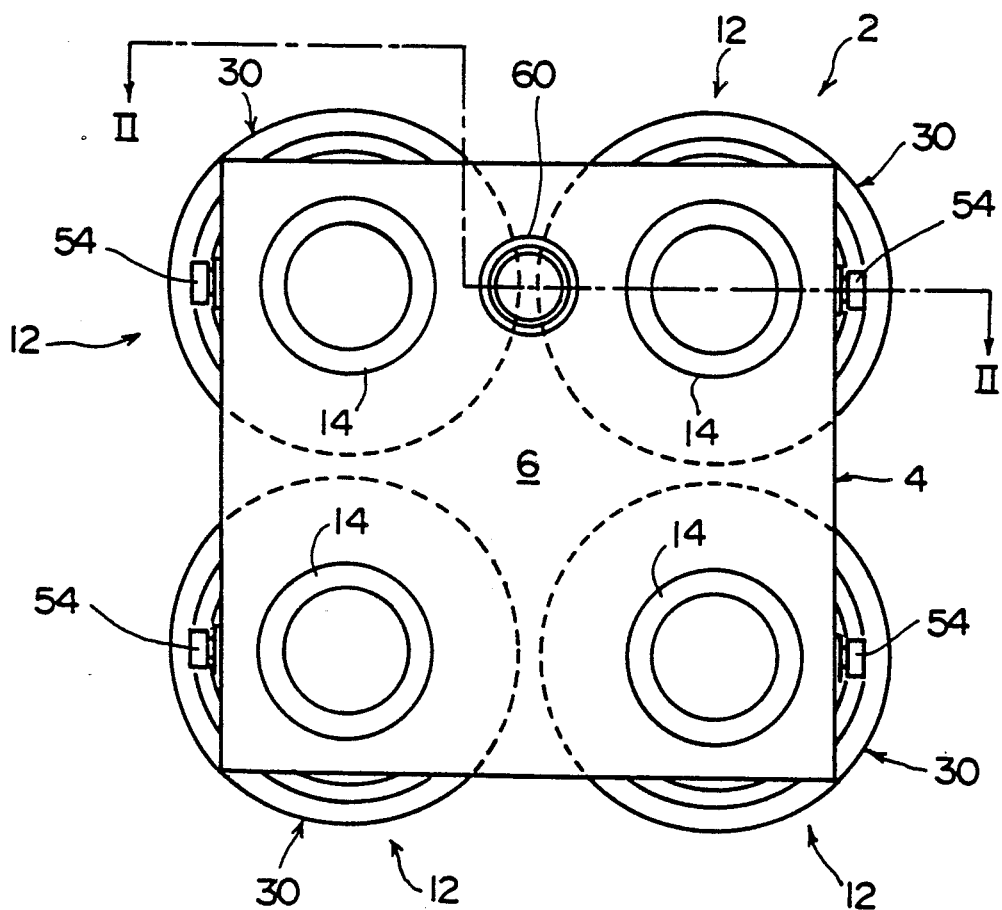
FIG. 1 is a front elevation of a preferred embodiment of the wall surface suction-adhering and moving device constructed in accordance with this invention.
Figure 2:
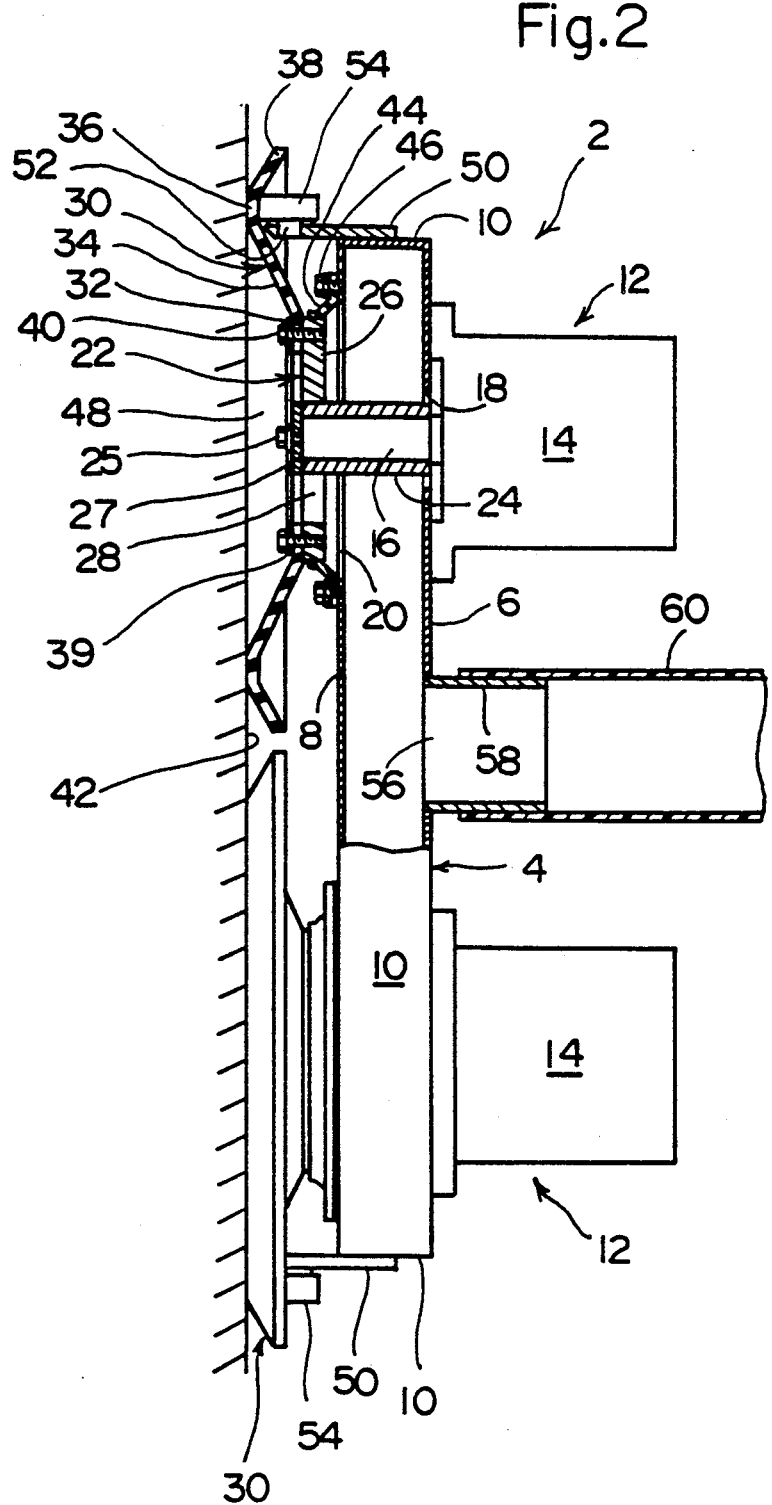
FIG. 2 is a sectional view taken along line II—II of FIG. 1.

With reference to FIGS. 1 and 2, the wall surface suction-adhering and moving device shown generally at 2 has a hollow box-like supporting frame 4 composed of an outside wall 6, an inside wall 8 and four side walls 10. Four suction-adhering and moving units 12 are mounted on the supporting frame 4. The four units 12 are substantially the same.

With reference mainly to FIG. 2, each of the suction-adhering and moving units 12 includes a rotating driving source 14 which may be an electric motor. The casing of the driving source 14 is fixed to the outside wall 6 of the supporting frame 4. The driving source 14 has a rotating output shaft 16 extending through an opening 18 formed in the outside wall 6 and an opening 20 formed in the inside wall 8. The opening 18 formed in the outside wall 6 is air-tightly sealed by a suitable sealing means not shown. The opening 20 formed in the inside wall 8 is also sealed air-tight as described hereinbelow. A rotating member 22 is fixed to the output shaft 16 of the driving source 14. The rotating member 22 has a cylindrical boss portion 24 fitted over the output shaft 16 and a circular plate-like main portion 26 located at the tip of the boss portion 24. A clamping plate 27 is fixed to the tip of the output shaft 16 by means of a clamping bolt 25, whereby the rotating member 22 is fixed to the output shaft 16 so that the rotating member 22 may be rotated as a unit with the output shaft 16. The circular plate-like main portion 26 of the rotating member 22 is positioned inwardly (left side in FIG. 2) of the inside wall 8 of the supporting frame 4. A plurality of openings 28 are formed at intervals in the circumferential direction of the main portion 26. A sealing means 30 formed of a flexible material such as synthetic rubber is fixed to the inside of the peripheral edge of the main portion 26. The sealing means 30 has an annular plate-like base portion 32, a conical-cylindrical main portion 34 extending inwardly from the base portion 32 so that it inclines radially outwardly, an annular plate-like contacting portion 36 extending radially from the forward edge of the main portion 34 and an extension 38 extending outwardly from the peripheral edge of the contacting portion 36 (to the right in FIG. 2) so that it inclines radially outwardly. As clearly shown in FIG. 2, the base portion 32 of the sealing means 30 is fixed to the inside of the peripheral edge portion of the main portion 26 or the rotating member 22 by means of an annular press plate 39 and a plurality of clamping bolts 40. Thus, the sealing means 30 is fixed to the rotating member 22. The contacting portion 36 of the sealing means 30 is kept in contact with a wall surface 42 which may be an upstanding wall surface. In relation to the circular plate-like main portion 26 of the rotating member 22, an annular sealing wall 44 is mounted on the peripheral part of the opening 20 formed in the inside wall 8 of the supporting frame 4. The annular sealing wall 44 which may be formed of a flexible material such as synthetic rubber extends inwardly from its outer circumferential portion fixed to the inside wall 8 by a plurality of clamping bolts 46 and inclining radially inwardly, and its tip portion is in contact air-tight with the outside surface of the main portion 26 of the rotating member 22. In this way, the opening 20 formed in the inside wall 8 is sealed air-tightly.

As can be easily understood from FIG. 2, the sealing means 30 whose contacting portion 36 is to make contact with the wall surface 42 forms a pressure-reduction space 48 in cooperation with the wall surface 43 and the rotating member 22. The pressure-reduction space 48 of the four suction-adhering and moving units 12 communicate each other through the opening 28 formed in the main portion 26 of the rotating member 22 and through the space in the supporting frame 3. A securing plate 50 is fixed to the side wall 10 of the supporting frame 4, and a roller means 54 is rotatably mounted on the forward end portion of the securing plate 50 through a short rod 52. This roller means 54 may be formed of rollers formed of a suitable synthetic resin, and are positioned in correspondence to the contacting portion 36 of the sealing means. More specifically, the roller means 54 is pressed against the wall surface 42 via a specific angular portion of the contacting portion of the sealing means 30.

Again, with reference to FIGS. 1 and 2, the invention will be described. A circular opening 56 is formed in the outside wall 6 of the supporting frame 4, and a cylindrical connecting member 58 is disposed in this opening 56. The connecting member 58 is connected to a vacuum source (not shown) which may be a vacuum pump by a flexible pipe 60. Thus, the pressure-reduction space 48 of each of the suction-adhering and moving unit 12 is connected to the vacuum source via the space of the supporting frame 4 and the space 48 is pressure-reduced.

In the wall surface suction-adhering and moving device constructed in accordance with this invention, the pressure-reduction spaces 48 of the suction-adhering and moving units 12 are connected to the vacuum source (not shown) through the space in the supporting frame, and the pressure-reduction space 48 and the space in the supporting frame 4 are reduced in pressure. The sealing means 30 is formed of a flexible material, but the rotating member 22, the supporting frame 4, the securing plate 50 and the roller means 54 are formed of a rigid or semi-rigid material. Accordingly, the pressure of an ambient fluid (the atmosphere where the wall surface suction-adhering and moving device 2 is to be used in atmospheric air, and a liquid where it is used in a liquid such as water) acting on the rotating member 22 and the supporting frame 4 owing to the difference in pressure between the inside and outside of the pressure-reduction space 48 is transmitted to the wall surface 42 through the roller means 54. As a result, the device 2 suction-adheres to the wall surface 42. On the other hand, owing to the difference in pressure between the inside and outside of the pressure-reduction space 48, the pressure of an ambient fluid acting on the sealing means 30, particularly its main portion 34 presses the contacting portion 36 of the sealing means 30 against the wall surface 42. Thus, the pressure-reduction space 48 is maintained in the pressure-reduced state. It is not necessary to keep the contacting portion 36 of the sealing means 39 in sufficient air-tight contact with the wall surface 42. Even if some fluid flows from between the contacting portion 36 of the sealing means 30 and the wall surface 42, there is no particular problem unless the amount of the fluid flow exceeds the predetermined limit.

When the driving source 14 is energized, the sealing means 30 is rotated. In addition, since the roller means 54 is pressed against the wall surface 42 via the contacting portion 30 of the sealing means 30, the rotation of the sealing member 30 is transmitted to the roller means 54. At a specific angular portion where the roller means 54 exists, the contacting portion 36 of the sealing member 30 is relatively strongly pressed against the wall surface 42 by the roller means 54. Thus, as compared with other areas where the roller means 54 is not present, the contacting pressure between the contacting portion 36 and the wall surface 42 is locally increased. Accordingly, when the sealing means 30 is rotated, a driving force acting tangentially to the angular site where the roller means 54 exists is produced in the contacting portion of the sealing means 39. This driving force moves the wall surface suction-adhering device 2 along the wall surface 42. The moving direction of the device 2 will be described. For example, when the sealing means 30 of the two suction-adhering and moving units 12 on the left side in FIG. 1 are rotated clockwise in FIG. 1, and the sealing means 30 of the two suction-adhering and moving units 12 on the right sided in FIG. 1 are rotated counterclockwise in FIG. 1, the wall surface suction-adhering and moving device 2 is moved downward in FIG. 1. On the other hand, when the sealing means 30 of the two suction-adhering and moving units 12 positioned in the left side in FIG. 1 are rotated counterclockwise in FIG. 1 and the sealing means 30 of the two suction-adhering and moving units 12 are positioned in the right side in FIG. 1, the wall surface suction-adhering and moving device 2 is moved upwardly in FIG. 1. When all sealing means 30 of the four suction-adhering and moving units 12 are rotated clockwise in FIG. 1, the wall surface suction-adhering and moving device 2 is pivoted counterclockwise in FIG. 1. On the other hand, if all sealing means 30 of the four suction-adhering and moving units 12 are rotated counterclockwise in FIG. 1, the wall surface suction-adhering and moving device 2 is pivoted clockwise in FIG. 1. Since the contacting portion 36 of each sealing means 30 is kept in contact with the wall surface 42, when the sealing means 30 is rotated, it makes a frictional and sliding motion on the wall surface 42 to exert a cleaning action by this frictional and sliding motion. If desired, to aid in the cleaning action on the wall surface 42 by the rotating sealing means 30, a cleaning means such as a brush may be provided in the sealing means 30.

While one specific embodiment of this invention has been described above with reference to the accompanying drawings, it should be understood that various changes and modifications can be made without departing from the scope of the invention described and claimed herein.

For example, in the illustrated embodiment, the sealing means 30 is connected to the driving source 14. If desired, however, instead of the sealing means 30, the roller means 54 may be connected to the driving source 14. When, in this case, the roller 34 is rotated by the energization of the driving source 14, the rotation of the roller means 54 is transmitted to the sealing means 30 to rotate the sealing means 30.

The control the moving direction of the wall surface suction-adhering device 2 very easily, it is possible, if desired, to provide one or more driven or non-driven wheels which directly make contact with the wall surface 42. Furthermore to facilitate the controlling of the moving direction of the wall surface suction-adhering and moving device 2, it is possible to provide a handle in the device 2, and to perform an additional moving direction control manually by holding the handle.

What we claim is:

1. A device for moving along a wall surface while suction-adhering thereto, comprising: a supporting frame; and at least one suction-adhering and moving unit mounted on said supporting frame, said suction-adhering and moving unit having a rotating member mounted rotatably on said supporting frame, a sealing member for forming a pressure-reduction space in cooperation with a wall surface and said rotating member, said sealing member having an annular base portion fixed to said rotating member, a main portion extending from said base portion in a direction away from said rotating member and an annular contacting portion adapted for contact with the wall surface; roller means rotatably supported on said supporting frame with the outer peripheral surface of said roller means in frictional contact with said annular contacting portion of said sealing means when said device is in operation, and a rotating driving source connected to either one of said rotating member and said roller means; wherein said device is suction-adhered to the wall surface as a result of reducing the pressure of the pressure-reduction space, and by energizing said rotating driving source, said rotating member and said roller means are both rotated to thereby move said device along the wall unit.

2. The device of claim 1 in which the rotating driving source is linked to the rotating member.

3. The device of claim 1 or 2 in which a plurality of suction-adhering and moving units are mounted on the supporting frame.

* * * * *